United States Patent [19]
McCann

[11] Patent Number: 6,132,130
[45] Date of Patent: Oct. 17, 2000

[54] EXCAVATOR HITCH

[76] Inventor: Noel Patrick Martin McCann, 17 Shillinghill, Tillicoultry, Clackmannshire, FK13, Scotland, United Kingdom

[21] Appl. No.: 08/726,764

[22] Filed: Oct. 7, 1996

[30] Foreign Application Priority Data

Oct. 6, 1995 [GB] United Kingdom ............... 9520448

[51] Int. Cl.⁷ ................................................ B25G 3/18
[52] U.S. Cl. ......................... 403/322; 37/468; 414/723; 403/315
[58] Field of Search ............... 37/468; 414/723, 414/724; 403/31, 321, 322, 325, 315, 316, 319

[56] References Cited

U.S. PATENT DOCUMENTS

| | | |
|---|---|---|
| 4,253,793 | 3/1981 | Braml . |
| 4,355,945 | 10/1982 | Pilch . |
| 4,436,477 | 3/1984 | Lenertz et al. . |
| 4,462,172 | 7/1984 | Caron . |
| 4,708,579 | 11/1987 | Baird et al. . |
| 4,726,731 | 2/1988 | Jones . |
| 4,761,113 | 8/1988 | Smith et al. . |
| 4,846,624 | 7/1989 | Hohn . |
| 4,881,867 | 11/1989 | Essex et al. ............................. 414/723 |
| 5,082,389 | 1/1992 | Balemi . |
| 5,088,882 | 2/1992 | Lovitt, Jr. . |
| 5,145,313 | 9/1992 | Weyer .................................. 37/468 X |
| 5,179,794 | 1/1993 | Ballinger . |
| 5,332,353 | 7/1994 | Arnold .................................. 414/723 |
| 5,400,531 | 3/1995 | Brown ...................................... 37/468 |
| 5,456,030 | 10/1995 | Barone et al. ....................... 414/723 X |
| 5,465,513 | 11/1995 | Sonerud .............................. 414/723 X |
| 5,549,440 | 8/1996 | Cholakon et al. .................... 37/468 X |

FOREIGN PATENT DOCUMENTS

| | | |
|---|---|---|
| 557890 | 3/1984 | Australia . |
| 9405014 | 7/1994 | Germany . |
| 1161736 | 8/1969 | United Kingdom . |
| 2167377 | 5/1986 | United Kingdom . |
| 2205299 | 5/1991 | United Kingdom . |
| 2267887 | 12/1993 | United Kingdom . |
| 2238035 | 3/1994 | United Kingdom . |

OTHER PUBLICATIONS

Publication dates unknown, but certainly prior to priority date of present application. OilQuick pamphlet.
Publication dates unknown, but certainly prior to priority date of present application. Pelles Hydrauliques brochure.
Publication dates unknown, but certainly prior to priority date of present application. VTN Benne pamphlet.

Primary Examiner—Terry Lee Melius
Assistant Examiner—William L. Miller
Attorney, Agent, or Firm—Gifford, Krass, Groh, Sprinkle, Anderson & Citkowski, P.C.

[57] ABSTRACT

A hitch for mounting a bucket on an excavator jib comprises a body (12) for mounting on a jib and defining first and second recesses (20, 21) for receiving respective first and second bucket mounting pins. A closure member (24) is mounted on the body and is movable between a retracted position, allowing location of a second bucket mounting pin in the second recess, and an extended position in which the member retains the second pin in the recess. The closure member has an axially movable carriage (26), the carriage being mounted on one or more guides extending transversely of the second recess (21).

10 Claims, 6 Drawing Sheets

EXCAVATOR HITCH

FIELD OF THE INVENTION

This invention relates to a hitch for mounting a bucket or other tool on the jib of an excavator.

BACKGROUND OF THE INVENTION

Conventionally, buckets, forks and other tools are mounted on the jib or arm of a hydraulic excavator by locating a pair of pins in aligned bores provided on the free end of the jib and the rear face of the bucket. As the buckets are relatively heavy and the clearances between the pins and bores are small, changing an excavator bucket can be a difficult and time consuming operation requiring a second person to assist the excavator operator. In view of these difficulties there have been a number of proposals for hitches which are secured on the end of the jib and which allow a bucket to be mounted or released from the jib in a relatively straightforward "one-man" operation. Examples of such hitches are described in U.S. Pat. Nos. 5,082,389 and 5,179,794. The disclosed hitches include mutually perpendicular recesses for receiving pins or crossbars provided on the bucket. The jib is first moved relative to a bucket resting on the ground such that a first pin is positioned in a respective forward recess. The hitch is then rotated on the jib to lift the bucket and bring the other pin into the rear recess. In U.S. Pat. No. 5,082,389 a spring biassed closure member is deflected inwardly by the pin as it moves into the rear recess and then returns to an extended position to partially close the recess and trap the pin. A hydraulic piston and cylinder assembly may be provided for retracting the member and releasing the pin. In another embodiment the closure member is biassed towards the retracted position while a piston and cylinder assembly is used to extend the member. In U.S. Pat. No. 5,179,794, movement of the second pin into the recess actuates a pawl to release a spring biassed wedge member which retains the pin in the recess.

It is among the objects of aspects of the present invention to provide a hitch which allows a bucket to be mounted on an excavator jib in a one-man operation and which has a bucket retaining arrangement which minimises the risk of unintentional release of a bucket from the hitch.

SUMMARY OF THE INVENTION

According to one aspect of the present invention there is provided a hitch for mounting a bucket on an excavator jib, the hitch comprising: a body for mounting on a jib and defining first and second recesses for receiving respective first and second bucket mounting pins; and a closure member on the body being movable between a retracted position, allowing location of a second bucket mounting pin in the second recess, and an extended position in which the member retains the second pin in the recess, the closure member having an axially movable carriage, the carriage being mounted on one or more guides extending transversely of the second recess.

In use, this arrangement facilitates provision of a sturdy and secure closure member and only a small degree of movement of the closure member is effective to secure the pin in the second recess. The hitch may also be used in conjunction with existing bucket mounting arrangements, changes in dimensions typically being the only modification necessary to accommodate buckets produced by different manufacturers.

Preferably, said first and second recesses are mutually perpendicular.

Preferably also, the carriage is mounted on two cylindrical rods. Preferably also, the closure member is located below the guides such that the guides may extend over the second recess.

Preferably also, the one or more guides are located in a plane between means for mounting the hitch on a jib and said recesses.

Preferably also, the hitch includes means for moving the closure member, which means may be actuated manually, hydraulically, pneumatically, electrically or by spring action. In a preferred embodiment, said moving means is in the form of a double-acting piston and cylinder arrangement.

Preferably also, the closure member substantially closes the second recess such that, in use, the second pin will be safely retained within the second recess even if the closure member is heavily worn or has not been fully extended. This contrasts with existing arrangements in which the second recess is only partially closed and a relatively small degree of retraction of the closure member could result in release of the pin and bucket.

Preferably also, the closure member includes a C-shaped portion for engaging the pin, the C-shaped portion opening in an opposing direction relative to the first recess. The closure member thus encloses three sides of the pin while a wall of the recess encloses the remaining fourth side. Most preferably, the extended closure member engages the respective side faces of the pin and thus holds the pin firmly to prevent movement of the pin, which movement might otherwise result in rapid wear and damage to the closure member, recess wall and pin surfaces. Unlike other hitches having mutually perpendicular recesses, the second pin may thus be solely located by the extended closure member, rather than by a clamping action between a closure member and a face of the recess. The closure member thus experiences substantially all of the wear such that the recess walls, which are typically integral with the body, are unlikely to be worn to any appreciable extent. Further, providing a C-shaped closure member having relatively long jaws ensures that the pin will not be released from the recess unless the member is retracted a substantial distance.

Preferably also, the contact area between the closure member and the second pin is relatively large and preferably extends across the width of the body. This large bearing area minimises the wear experienced by both the closure member and the pin.

Preferably also, the closure member is moved between the extended and retracted arrangements by one of a hydraulic actuator, a screw and follower, or a spring biased over centre arrangement. Each of these arrangements provides for positive locking of the closure member and thus prevents inadvertent release of the pin as might occur in a simple spring biassed arrangement if the closure member was, for example, struck by an object during a digging operation.

In a hydraulically actuated hitch, the hydraulic supply is preferably linked to a hydraulic jib actuator, which is typically in the form of one or more hydraulic piston and cylinder assemblies, such that the supply pressure of hydraulic fluid to the closure member actuator is increased during a digging movement of the jib. This ensures that the pins are held tightly in the recesses when the hitch and bucket are experiencing the most extreme operating conditions.

Various sensors and alarms may be provided to alert the operator to the position of the closure member. Also, operation of the closure member preferably requires the operator to leave the cab of the excavator to, for example, fit a safety pin or other locking device to minimise the possibility of the bucket being inadvertently released.

Preferably also, the carriage includes a locking member which may be fixed relative to the body to lock the closure member in the extended position. The locking member may be in the form of a recess, bore or hook which engages a cross member. The cross member may be in the form of a pin to be located in bores in the body once the closure member is positioned in the extended position. The carriage may include means for indicating, to the excavator operator, whether the closure member is extended or retracted. The indicator may be in the form of a rod or bar which extends from the body when the closure member is retracted.

When the hitch is to be used together with a bucket or other tool requiring hydraulic actuation, such as a tilting bucket or grab, the hitch may include means for forming a hydraulic connection between the excavator hydraulic fluid supply lines and the bucket. Preferably, a first fluid coupling is provided on the hitch and is adapted to engage a second fluid coupling on the bucket, the first fluid coupling being mounted to the carriage Bach that first fluid coupling automatically engages the second fluid coupling on extension of the coupling member.

According to another aspect of the present invention there is provided a hitch for mounting a bucket on an excavator jib, the hitch comprising: a body for mounting on a jib and defining first and second substantially perpendicular recesses for receiving respective first and second bucket mounting pins; and a closure member mounted on the body and having a C-shaped pin engaging portion opening in an opposing direction relative to the first recess, the closure member being movable between a retracted position, allowing location of the second pin in the second recess, and an extended position in which the second pin is engaged by and located in said pin engaging portion.

According to a further aspect of the present invention there is provided a hitch for mounting a bucket on an excavator jib, the hitch comprising: a body for mounting on a jib and defining first and second recesses for receiving respective first and second bucket mounting pins; a closure member mounted on the body, the closure member being movable between a retracted position, allowing location of the second pin in the second recess, and an extended position in which the second pin is engaged by and located in the closure member; and a double-acting piston and cylinder arrangement operatively associated with the closure member and for moving the closure member between the retracted and extended positions.

According to a still further aspect of the present invention there is provided a hitch for mounting a bucket on an excavator jib, the hitch comprising: a body for mounting on a jib and defining first and second recesses for receiving respective first and second bucket mounting pins; a closure member mounted on the body, the closure member being movable between a retracted position, allowing location of the second pin in the second recess, and an extended position in which the second pin is engaged by and located in the closure member; and a pivot link between the closure member and the body including a resilient deformable bushing, whereby the relative position of the closure member on the body member may vary to accommodate differently spaced bucket mounting pins.

In use, this aspect of the invention permits a single hitch to be used in conjunction with a variety of different buckets or other tools; different buckets, even from the same manufacturer, often have mounting pins which are spaced differently.

Preferably, means is provided for biassing the closure member towards the extended position. A lever may be provided for moving the closure member towards the retracted position, to permit a second pin to move into the second recess.

Preferably also, a lock is provided for retaining the closure member in the extended position. The lock may be in the form of a retaining member, such as a pin, which extends through aligned apertures in the closure member and body. A variety of retaining member receiving apertures may be provided, to accommodate different relative positions of the closure member and body.

BRIEF DESCRIPTION OF DRAWINGS

These and other aspects of the invention will now be described, by way of example, with reference to the accompanying drawings, in which.

DESCRIPTION OF PREFERRED EMBODIMENTS

Figure 1:
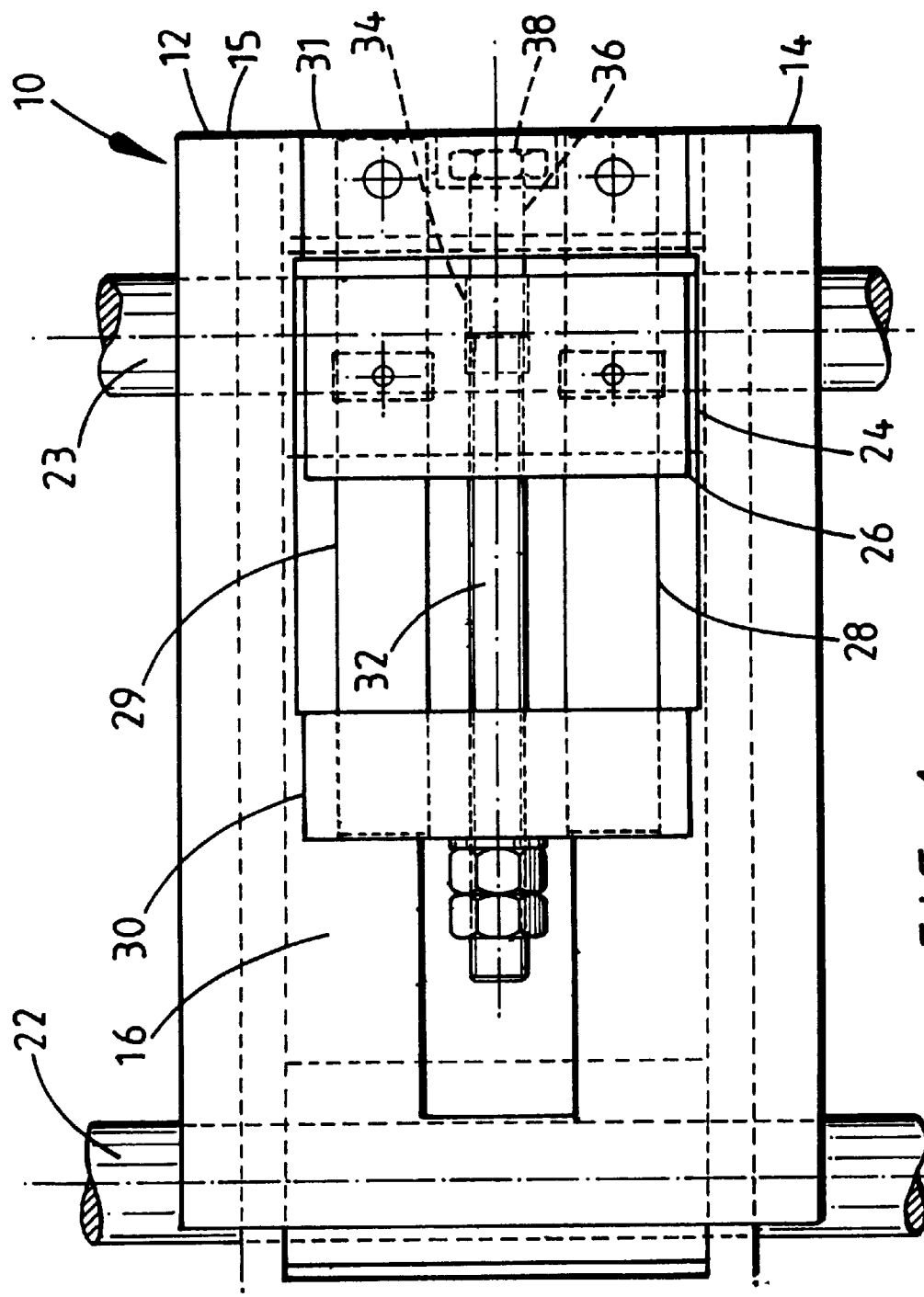
FIG. 1 is a plan view of a manually operable hitch in accordance with a first embodiment of the present invention.
Figure 2:
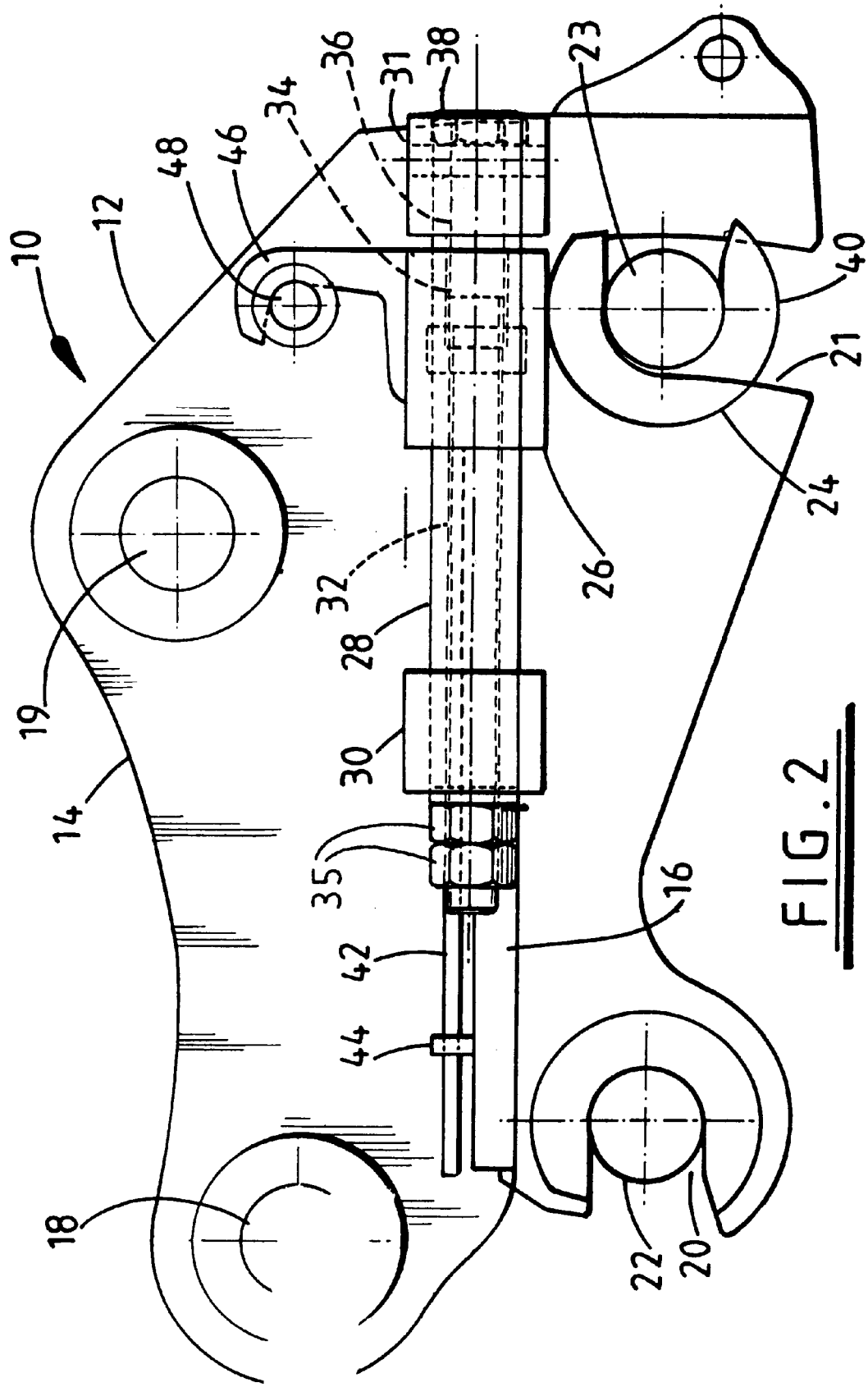
FIG. 2 is an elevational view of the hitch of FIG. 1.

Reference is first made to FIGS. 1 and 2 of the drawings which illustrate a hitch 10 for use in mounting buckets and other tools on the jib of an excavator. The hitch 10 comprises a body 12 including a pair of side plates 14, 15 and a cross plate 16. The side plates 14, 15 each define a pair of bores 18, 19 for receiving pins (not shown) for mounting the hitch 10 on the end of a conventional excavator jib (bucket not shown). Each side plate 14, 15 also defines a pair of mutually perpendicular recesses 20, 21 for receiving respective first and second pins 22, 23 provided on the rear wall of a bucket or other tool (not shown).

The second pin 23 is retained in the recess 21 by a C-shaped closure member 24 which extends across the width of the body 12 between the side plates 14, 15. Conveniently, the closure member 24 is formed by machining a bushing or other tubular form. The member 24 is mounted on the lower face of a carriage 26 which travels on a pair of parallel cylindrical rods 28, 29 extending along the body 12. The ends of the rods 28, 29 are located in cross members 30, 31 extending between the side plates 14, 15. A threaded rod 32 is positioned between the rods 28, 29 and extends through the front cross member 30 and into the carriage 26 where the end of the rod engages a threaded sleeve 34 which is rotatable relative to the carriage 26 but is fixed axially relative to the carriage. The front end of the rod is secured to the cross member 30 by a pair of conventional hexagonal lock nuts 35, but equally may be locked by a ratchet lock nut in which a spring steel bar fixed to the body engages a toothed nut. The rear end of the sleeve 34 is engaged by a pin 36 provided with a hexagonal head 38 located in an open recess in the rear cross member 31. Thus, by rotating the pin 36 using, for example, a ratchet and socket, the carriage 26 and closure member 24 may be moved along the threaded rod 32, and thus moved axially relative to the body 12 and substantially perpendicularly relative to the recess 21.

FIGS. 1 and 2 illustrate the closure member 24 in its fully extended position, in which the bearing surfaces of the member 34 engage three sides of the pin 23. It will also be noted that, in this particular example, the lower jaw 40 of the member 24 completely closes the recess 21 and that a substantial degree of retraction of the closure member 24 would be necessary to release the pin 23 from the recess 21.

FIG. 2 illustrates an indicator rod 42 which is attached to the carriage 26 and moves axially with the carriage, being held in place by guides 44 mounted on the cross plate 16. When the closure member 34 is retracted the end of the rod 42 extends beyond the side plates 14, 15 and is visible to the excavator operator, thus providing an indication of the closure member position without the operator having to leave the cab of the excavator.

A pair of hooks 46 are mounted on the upper surface of the carriage 26 and, when the closure member 24 is in the fully extended position, the hooks are aligned with a pair of bores 48 provided in the side plates 14, 15. Thus, a pin may be located in the bores 48 to lock the carriage 26 and closure member 24 in the extended position.

In use, the hitch 10 will be initially mounted on a excavator jib with the closure member 24 fully retracted, such that the recess 21 is fully open. To mount a bucket on the hitch 10, the excavator jib is manipulated such that the first pin 22 is located within the first recess 20. The jib is then configured to rotate the hitch 10 clockwise to lift the bucket, which is now supported from the hitch 10 by the first pin 22. Further rotation of the hitch 10 brings the second pin 23 into the recess 21. Once this has occurred, the excavator operator rotates the pin 36 to extend the closure member 24 to the position as shown in FIG. 2. The bucket is now securely attached to the hitch 10 .

Figure 3:
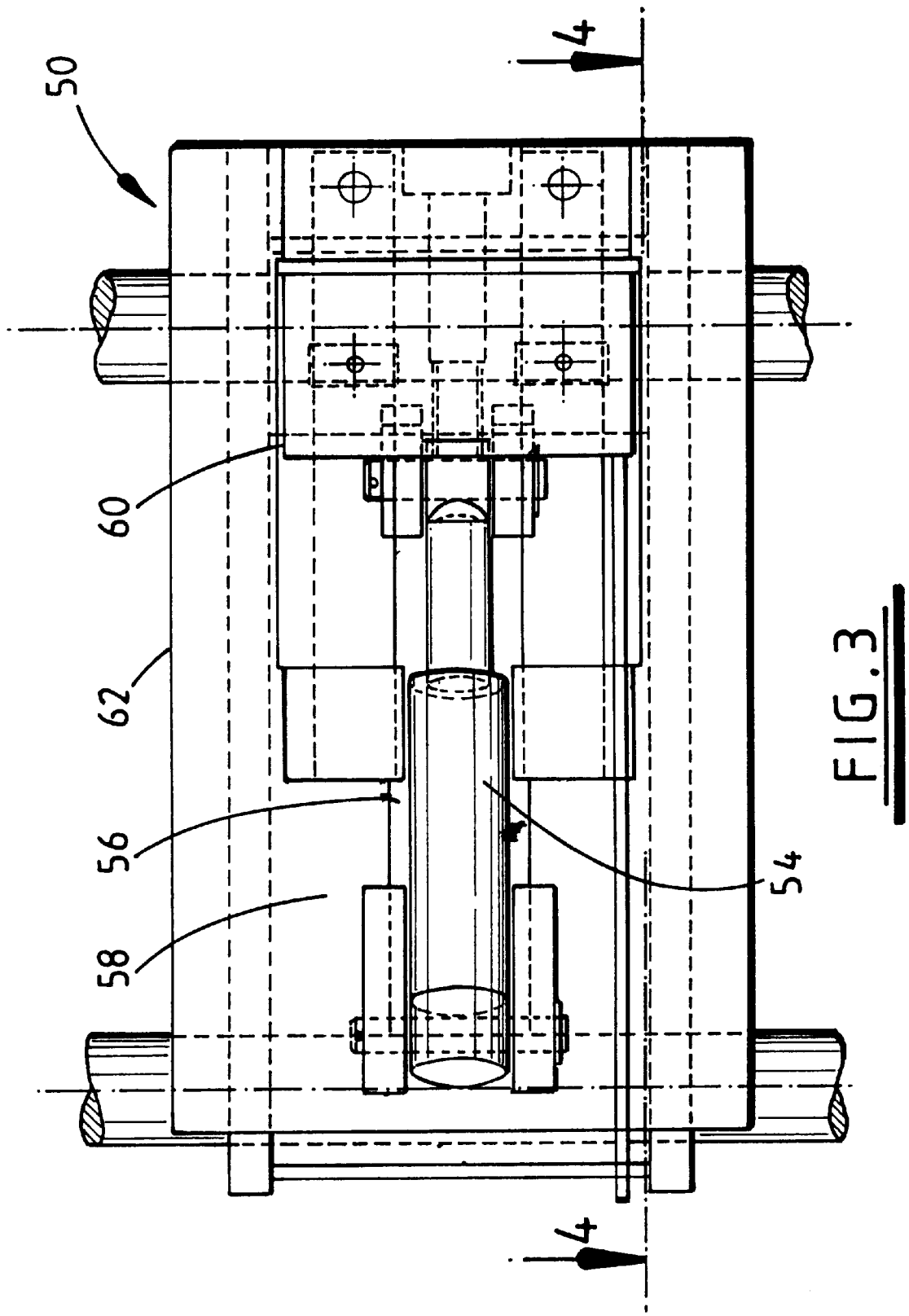
FIG. 3 is a plan view of a hydraulically actuated hitch in accordance with a second embodiment of the present invention.
Figure 4:
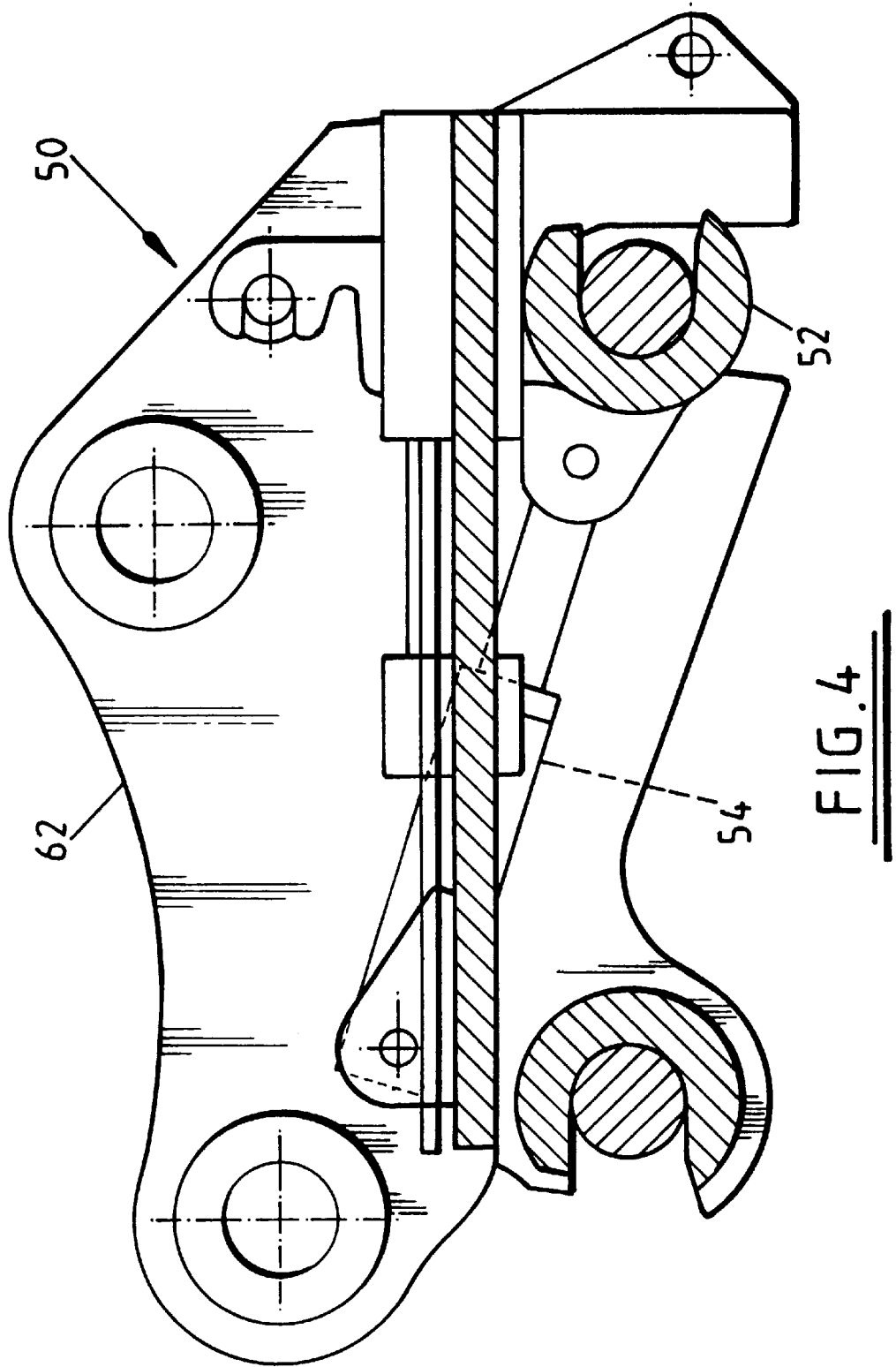
FIG. 4 is a sectional view on line 4—4 of FIG. 3.

Reference is now made to FIGS. 3 and 4 of the drawings, which illustrate a hitch 50 in accordance with a second embodiment of the invention. The hitch 50 is similar in many respects to the hitch 10 described above, but is hydraulically actuated, rather than manually actuated. Accordingly, the closure member 52 is linked to a double-acting piston and cylinder assembly 54 mounted in a slot 56 in the hitch cross plate 58. Supplying hydraulic fluid to one side of the piston causes the carriage 60 to move rearwardly relative to the hitch body 62 and the closure member 52 to move to the extended position. Supplying hydraulic fluid to the other side of the piston results in retraction of the closure member 52.

Conveniently, the piston and cylinder assembly 54 is linked to the excavator hydraulic fluid supply system used to operate the jib, though a separately controllable supply for the assembly 54 is preferred to ensure that the closure member 52 remains in the desired position, irrespective of the movement of the jib. However, the piston and cylinder assembly 54 may be linked to the piston and cylinder assemblies on the jib which provide the digging action by an appropriate valve such that during a digging operation the hydraulic fluid pressure in the piston and cylinder assembly 54 is increased, to firmly secure the bucket and prevent movement of the bucket relative to the hitch 50, which would otherwise result in accelerated wear and damage to the hitch 50 and the bucket mounting pins.

Figure 5:
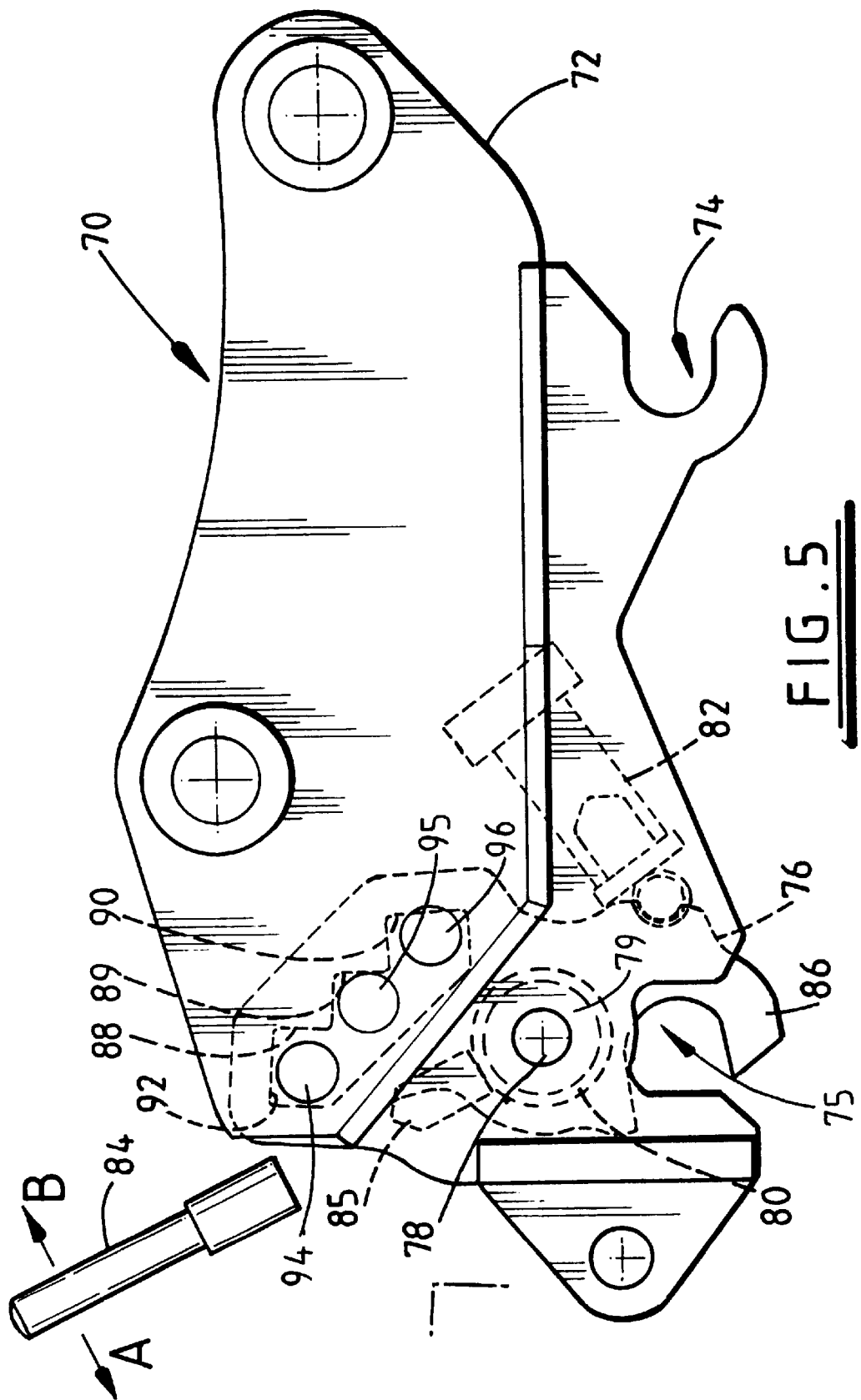
FIG. 5 is a side elevation of a hitch in accordance with a third embodiment of the present invention.
Figure 6:
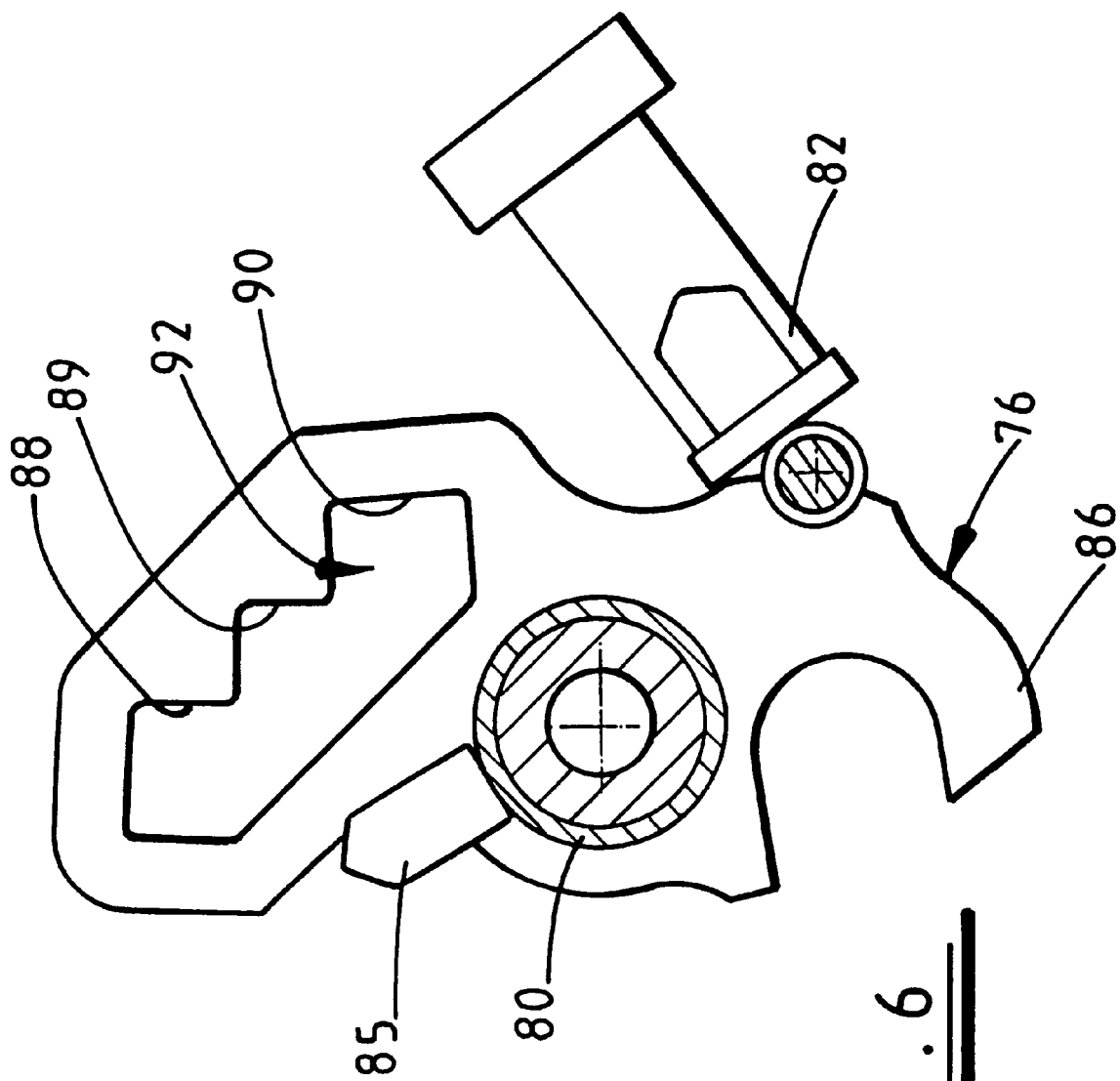
FIG. 6 is a sectional side elevation of the closure member of the hitch of FIG. 5.

Reference is now made to FIGS. 5 and 6 of the drawings, which illustrate a hitch 70 in accordance with a third embodiment of the present invention, primarily intended for use with "mini" excavators and backhoes. The hitch 70 comprises a body 72 of generally similar form to the hitches 10, 50 described above, defining first and second bucket pin receiving recesses or clevises 74, 75. A closure member 76 is pivotally mounted on the body 72 and is movable between a retracted position, to permit a bucket mounting pin to pass into the clevis 75, and an extended position (as illustrated) to retain a bucket mounting pin in the clevis 75.

The closure member 76 is pivotally mounted on the body via a body-mounted pin 78 and a resilient deformable rubber bush 80 on the closure member 76 which permits a degree of movement of the member 76 relative to the body 72 to accommodate different bucket mounting pin locations; the closure member 76 is thus effectively self-adjusting. The bush 80 is located in a cylinder 80 fixed to the member 76.

The illustrated hitch features a closure member 76 which is biassed towards the extended position by a spring 82. To retract the member 76 an operator engages an open-ended lever 84 with a pin 85 extending from the cylinder 80 and then pulls on the lever in the direction of arrow A, against the action of the spring 82. Once the bucket mounting pin is positioned in the open clevis 75, the lever is released and the closure member returns to the extended position. To lock the member 76 in the extended position, the operator pulls on the lever 84 in the opposite direction (B) bringing the C-shaped closure member jaw 86 into contact with the bucket pin. Applying further force to the lever 84 results in deformation of the bush 78, to bring one of three bearing surfaces 88, 89, 90 defined in a stepped opening 92 of the member 76 into alignment with, or just beyond, a respective one of three locking pin receiving hole pairs 94, 95, 96. On release of the lever 84, the bush 80 attempts to return to its undeformed configuration, thus creating an additional retaining force on the bucket mounting pin.

It will be clear to those of skill in the art that the above described embodiments are merely exemplary of the present invention, and that various modifications and improvements may be made thereto, without departing from the scope of the invention. The above embodiments illustrates manual, spring-biassed and hydraulic actuation, though of course other actuation arrangements could be utilised, including other forms of manual actuation and electrical actuation. Further, although the hitches have been described herein with reference to uses in conjunction with buckets and excavators, it will be clear to those of skill in the art that hitches in accordance with the invention may be utilised on cranes, front loaders, backhoes and other machines for mounting a wide variety of tools, including forks and rock drills.

What is claimed is:

1. A hitch for mounting a bucket on a excavator jib, the hitch comprising: a body for mounting on the jib; first and second bucket mounting pins; first and second recesses formed in said body and opening in mutually perpendicular directions for receiving said respective first and second bucket mounting pins; at least one cylindrical guide having ends rigidly fixed to the body and extending axially of the body and transversely over the second recess; and a closure member comprising a pin engaging portion defining a C-shaped pin contact area for engaging said second bucket mounting pin, said closure member being movable between a retracted position, allowing location of the second bucket mounting pin in the second recess, and an extended position in which the pin engaging portion engages and retains said second bucket mounting pin in the second recess, the closure member further comprising an axially movable carriage mounted on said at least one cylindrical guide and movable therealong said entire C-shaped pin contact area being in contact with said second bucket mounting pin.

2. The hitch of claim 1, wherein said at least one cylindrical guide comprises two cylindrical rods.

3. The hitch of claim 1, wherein the pin engaging portion of the closure member is located below said at least one cylindrical guides and the at least one guide extend-over the second recess.

4. The hitch of claim 1, wherein the body defines means for mounting the hitch on a jib and said at least one cylindrical guide is located in a plane between said means for mounting the hitch on the jib and said first and second recesses.

5. The hitch of claim 1 further comprising means for moving the closure member along said at least one cylindrical guide.

6. The hitch of claim 5, wherein said moving means is a double-acting piston and cylinder arrangement.

7. The hitch of claim 1 wherein said pin engaging portion opens in an opposing direction relative to the first recess.

8. The hitch of claim 7, wherein the body further comprises a pair of side plates and bearing surface of the pin engaging portion extends across the width of the body between said plates.

9. A hitch for mounting a bucket on an excavator jib, the hitch comprising: a body for mounting on the jib and comprising a pair of spaced side plates defining first and second substantially perpendicular recesses; first and second cylindrical bucket mounting pins receivable in said respective first and second recesses; and a closure member mounted on the body and comprising a pin engaging portion defining a C-shaped pin contact area for engaging the second cylindrical bucket mounting pin and opening in an opposing direction relative to the first recess, said closure member extending beyond a midpoint between the side plates, the closure member being movable between a retracted position, allowing location of said second cylindrical bucket mounting pin in the second recess, and an extended position in which the second cylindrical bucket mounting pin may be located in the recess engaged by and located in the pin engaging portion of the closure member, said entire C-shaped pin contact area being in contact with said second cylindrical bucket mounting pin.

10. A hitch for mounting a bucket on an excavator jib, the hitch comprising: a body having means for mounting the hitch on the jib and defining first and second perpendicular recesses for receiving respective first and second bucket mounting pins; guides extending axially of the body and tansversely over and above the second recess and below said means for mounting the hitch on a jib; a closure member comprising a pin engaging portion and a carriage mounted on said guides for axial movement therealong, the closure member being movable between a retracted position, allowing location of said second bucket mounting pin in the second recess, and an extended position in which said second bucket mounting pin located in the second recess is engaged by and located in the pin engaging portion; and a double-acting piston and cylinder arrangement having a first end pivotally mounted to the body and a second end pivotally mounted to the pin engaging portion of the closure member, said piston and cylinder arrangement being for moving the closure member between the retracted and extended positions, both said second end of the piston and cylinder arrangement and said second recess being located below said guides.

* * * * *